LOCKWOOD & PITMAN.
Car Seat.
No. 53,842.
Patented Apr. 10, 1866.
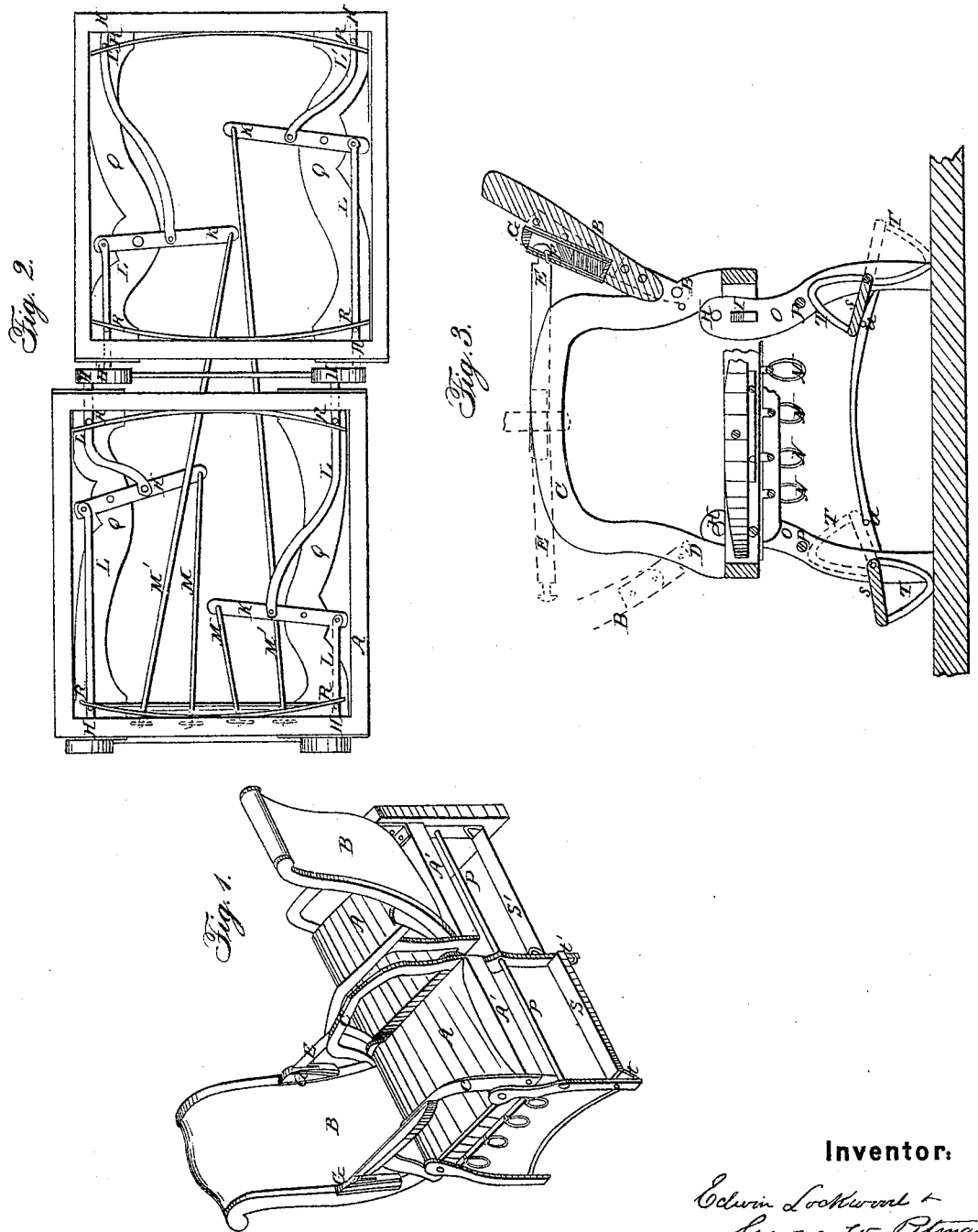
Witnesses:
Inventor:
Edwin Lockwood &
George W. Pitman

UNITED STATES PATENT OFFICE.

EDWIN LOCKWOOD AND GEORGE W. PITMAN, OF BORDENTOWN, N. J.

IMPROVED CAR-SEAT.

Specification forming part of Letters Patent No. 53,842, dated April 10, 1866.

*To all whom it may concern:*

Be it known that we, EDWIN LOCKWOOD and GEORGE W. PITMAN, of Bordentown, in the county of Burlington and State of New Jersey, have invented certain new and useful Improvements in Car Seats and Couches; and we do hereby declare that the following is a full, clear, and exact description of the same, reference being had to the annexed drawings, made part of this specification, in which—

Figure 1 is a perspective view of a car-seat. Fig. 2 is a plan showing the arrangement of the adjusting mechanism, and Fig. 3 is a vertical transverse section of a seat.

In the different views the same letters refer to identical parts.

The invention now sought to be patented relates to improvements made on our improvements set forth in our patent of June 13, 1865.

A A are cushioned seats, detachable and setting upon a frame suitably arranged. B is the detachable back. This is fastened to the arm-pieces C, supported by the square frame A', which supports the seats A. At the lower ends of the side pieces of the back B are hooks D, secured by studs projecting from the side pieces, as shown in the drawings.

The backs are retained in position by the braces E, turning freely at one end on a pivot on the middle of the arm-pieces C, and adjustably attached to the backs by the arrow-shaped heads F, which are retained by a jaw-formed catch on the side pieces of the back. The upper part of this catch being raised, as shown by the red lines in Fig. 3, the end of the brace is released. The backs can then be detached and transferred to the other side, the braces shifted, and the back by the same means be reattached.

It will be observed that the seats and backs being attached to the same frame they always retain the same relative position as to one another.

The frame A', supporting the seat A and back B, is not permanently fastened to the legs O; but the latter, being securely attached to the floor and properly braced, support the frame and seats by the points of the rods L and L' fitting into corresponding depressions H and I in the inner sides of the legs O, as shown.

I is not square on the corners, but beveled away on the upper side, so as to permit the rods L and L' to escape as the frame is raised, but square below, so as to retain the seat in the required position. There may be a series of these catches I, or the frame may be made to drop onto the cross-bar P, which acts also as a brace for the legs O.

The rods L and L' are attached to levers K, which are pivoted on the plates Q, which pass longitudinally across the frame. These rods are fastened in couples to each lever, and at equal distances on each side of the pivot forming the fulcrum of the lever, and the rods L and L' work into opposite ends of the frame and opposite to one another, front and back, there being two sets of levers K and rods L L' in each frame for a single seat. The rods L and L' are pressed outward through the frame and into the corresponding depressions H and I by stress of the springs R.

To the long ends of the levers are attached the rods M and M', which run from the end of the seat nearest the aisle of the car, and are attached one to each lever.

In the plan shown in our former patent the ends of the levers projected from the front or rear of the seat, which made it difficult to operate them when the seats were occupied. By introducing the rods M and M' the levers may be worked from the aisle without disturbing the passenger.

By introducing two sets of rods and levers, in combination with the adjustable back, we are enabled to regulate the seats when the car is going in either direction.

The foot-rest S is a board attached by pivots, on which it turns freely, to the legs O. T is a stirrup supporting this foot-rest in front of the seat, and in one position, while it is supported by catches U on the brace of the legs in another. This foot-rest has this advantage over others in use, that when turned down, as shown by S in Fig. 1, it is fitted for a person with short legs, and when turned up, as shown by S' in Fig. 1, it is fitted for a long-legged person.

When the rods are in the catches or depressions H the bottom of the seat is horizontal. By drawing out the rods M the catches on one side are disengaged, and the seat and back drop into the catch I or down upon the brace P, as may be desired. By this means the seats are readily converted into couches of such inclination as may be preferred.

By any convenient device, the rods M and M' being detached from the levers K, the entire seat and frame may be lifted out for convenience in the thorough cleaning of the car or for repairs.

Having fully explained the nature of our improvements, what we claim as our invention, and seek to secure by Letters Patent, is—

1. The detachable back B, united with the frame through the arm-pieces C by means of the hooks D and brace E and catch G F, so as always to maintain the same relation to the seat A, substantially as set forth.

2. In combination with the detachable backs B, a double system of rods and levers, so as to make either side of the seat adjustable, substantially as set forth.

3. In combination with the levers K, the rods M M', when arranged substantially as and for the purpose set forth.

4. In combination with the rods L and L', a series of detents, I, and the fixed rod P, operating as a stop, so arranged that a greater or less inclination can be given to the seats A, substantially as set forth.

5. The adjustable foot-rest S, arranged substantially as and for the purpose set forth.

In testimony whereof we have signed our names to this specification in presence of two subscribing witnesses.

EDWIN LOCKWOOD.
GEORGE W. PITMAN.

Witnesses:
NICOLL F. SMITH,
WILLIAM R. HAFFELFINGER.